(12) United States Patent
Coburn et al.

(10) Patent No.: US 8,947,824 B1
(45) Date of Patent: Feb. 3, 2015

(54) TAPE GUIDE ROLLER WITH SERPENTINE FLANGES

(71) Applicant: Oracle International Corporation, Redwood City, CA (US)

(72) Inventors: Peter R. Coburn, Lafayette, CO (US); William J. Vanderheyden, Loveland, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/068,315

(22) Filed: Oct. 31, 2013

(51) Int. Cl.
*G11B 15/60* (2006.01)

(52) U.S. Cl.
USPC ............................................................ 360/93

(58) Field of Classification Search
USPC ............................................................ 360/93
See application file for complete search history.

(56) References Cited

U.S. PATENT DOCUMENTS

| | | | | |
|---|---|---|---|---|
| 5,638,238 | A * | 6/1997 | Kubota et al. | 360/130.21 |
| 6,570,740 | B1 * | 5/2003 | Anderson et al. | 360/130.21 |
| 6,873,495 | B2 * | 3/2005 | Dinhobl | 360/130.21 |
| 7,261,250 | B1 | 8/2007 | Underkofler et al. | |
| 7,349,181 | B2 * | 3/2008 | Argumedo et al. | 360/130.21 |
| 7,515,382 | B2 * | 4/2009 | Argumedo et al. | 360/130.21 |
| 8,210,463 | B2 | 7/2012 | Ruyten et al. | |
| 8,432,640 | B2 * | 4/2013 | Fasen et al. | 360/130.21 |
| 8,611,047 | B2 * | 12/2013 | Ohtsu et al. | 360/130.21 |

\* cited by examiner

*Primary Examiner* — Mark Blouin
(74) *Attorney, Agent, or Firm* — Brooks Kushman P.C.

(57) ABSTRACT

A tape guide roller is provided for use with a tape drive configured to receive a length of tape. The tape guide roller includes a roller body having an outer surface for receiving the tape thereon, and flanges on opposite ends of the roller body. At least one of the flanges has a portion with a serpentine configuration in cross-section.

13 Claims, 5 Drawing Sheets

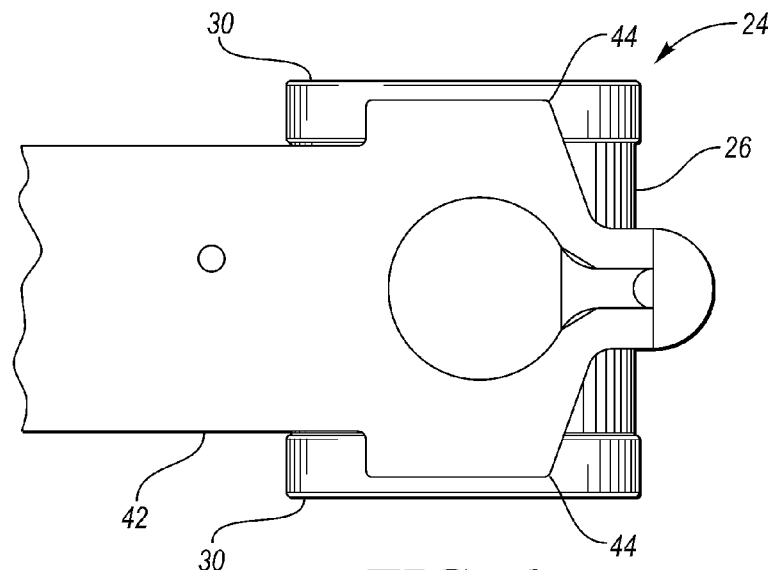
FIG. 6
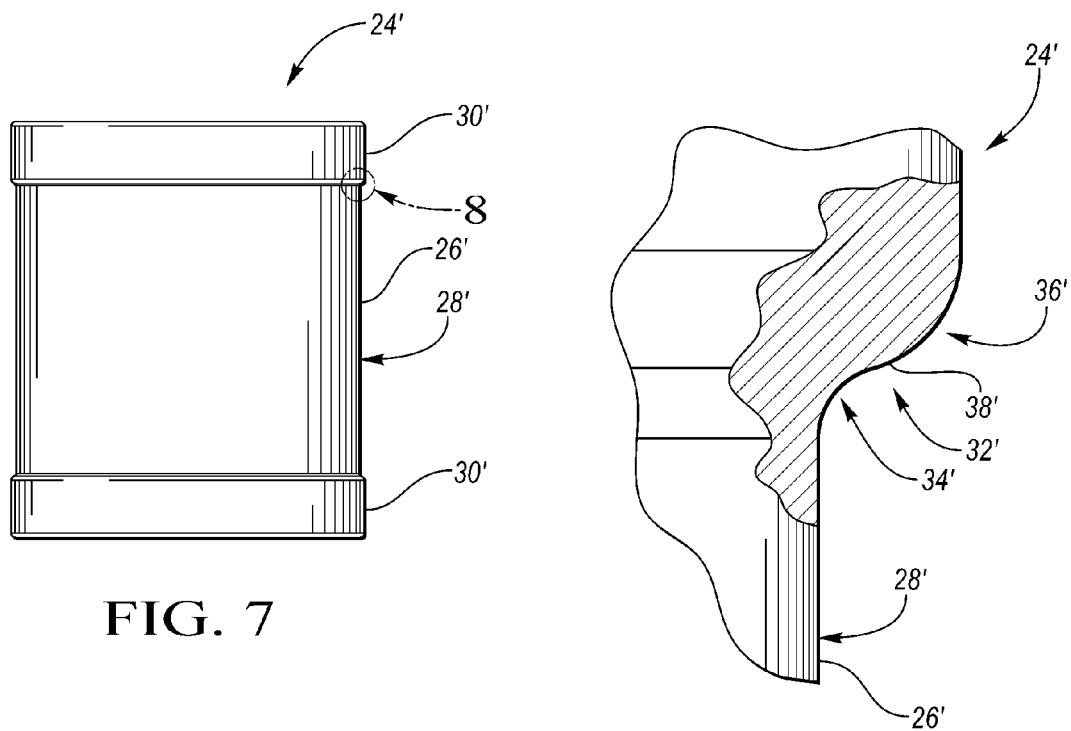
FIG. 7
FIG. 8

US 8,947,824 B1

TAPE GUIDE ROLLER WITH SERPENTINE FLANGES

TECHNICAL FIELD

The disclosure relates to a tape guide roller for use with a tape drive, and a tape drive including such a guide roller.

BACKGROUND

Tape guides, such as guide rollers, may be used to guide a tape along a tape path in a tape drive. Examples of guide rollers are shown in U.S. Pat. Nos. 6,570,740; 6,873,495; 7,261,250 and 8,210,463.

SUMMARY

A tape guide roller, according to the disclosure, is provided for use with a tape drive configured to receive a length of tape. The tape guide roller includes a roller body having an outer surface for receiving the tape thereon, and flanges on opposite ends of the roller body. At least one of the flanges having a portion with a serpentine configuration in cross-section.

A tape drive, according to the disclosure, for use with a length of tape includes a drive body, and a tape guide roller mounted on the drive body. The tape guide roller includes a roller body having an outer surface for receiving the tape thereon, and flanges on opposite ends of the roller body. At least one of the flanges having a portion with a serpentine configuration in cross-section.

While exemplary embodiments are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 6 is a side view of the guide roller and a tape leader engaged with the guide roller;

FIG. 7 is a side view of a second embodiment of a guide roller according to the present disclosure;

FIG. 8 is an enlarged view of a portion of the guide roller of FIG. 7, shown partially in section;

DETAILED DESCRIPTION

As required, detailed embodiments are disclosed herein; however, it is to be understood that the disclosed embodiments are merely examples and other embodiments can take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the present disclosure. As those of ordinary skill in the art will understand, various features illustrated and described with reference to any one of the figures can be combined with features illustrated in one or more other figures to produce embodiments that are not explicitly illustrated or described.

Figure 1:
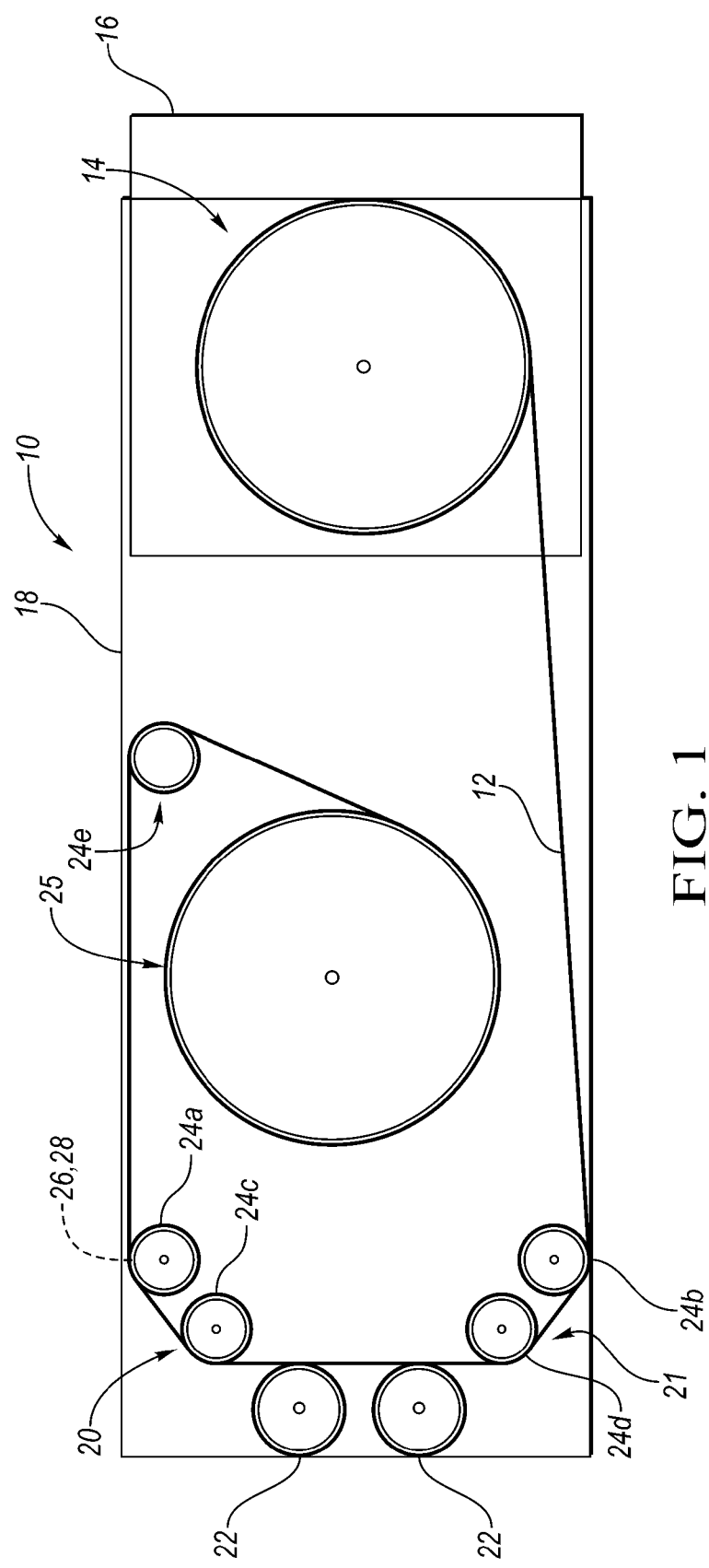
FIG. 1 is a plan view of a tape drive including multiple guide rollers according to the present disclosure.
Figure 2:
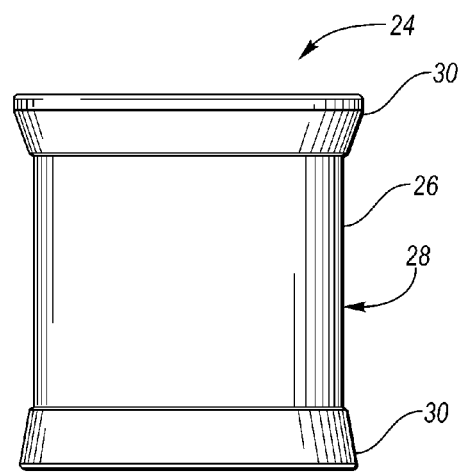
FIG. 2 is a side view of an exemplary guide roller according to the present disclosure.
Figure 3:
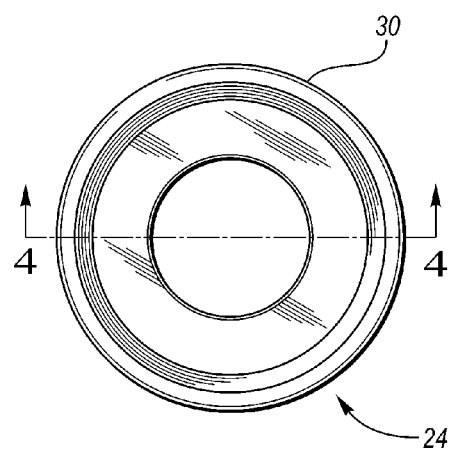
FIG. 3 is a top view of the guide roller of FIG. 2.
Figure 4:
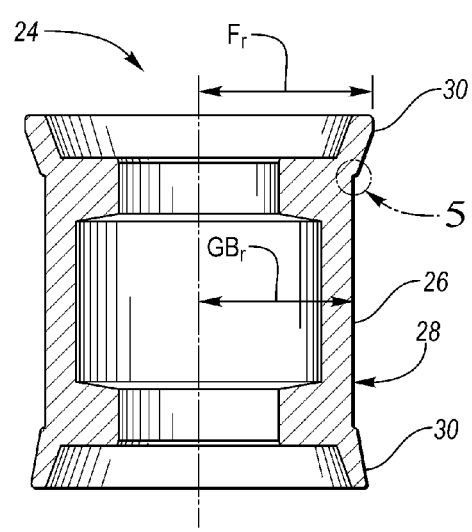
FIG. 4 is a cross-sectional view of the guide roller taken along line 4-4 of FIG. 3.

FIG. 1 shows a data storage device in the form of a tape drive 10, according to the present disclosure, for use with a tape 12, such as a magnetic tape or optical tape. While the tape 12 may be provided in any suitable manner, in the illustrated embodiment, the tape 12 is provided by a cartridge reel 14 of a tape cartridge 16 that is insertable into and removable from the tape drive 10. Furthermore, the tape 12 may have any suitable width, such as a width in the range of 0.4977 to 0.4983 inches (e.g., 0.4980+/−0.0003 inches).

The tape drive 10 shown in FIG. 1 includes a drive body 18 configured to receive the tape cartridge 16, a tape guide arrangement 20 mounted on the drive body 18 for guiding the tape 12 along a tape path 21 of the drive body 18, and one or more heads 22, such as magnetic heads or optical heads or pick-up units, for reading data from and/or writing data to the tape 12.

The tape guide arrangement 20 may include one or more tape guides, such as tape guide rollers 24, mounted on the drive body 18. For example, each guide roller 24 may be rotatably mounted on a fixed pin or axle that extends from the drive body 18 through the center of the roller guide. Ball bearings or the like may also be used to reduce friction and minimize wear between the roller guide and the pin or axle on which it turns.

In the embodiment shown in FIG. 1, the tape guide arrangement 20 includes first and second outer guide rollers 24a, 24b, first and second inner guide rollers 24c, 24d positioned proximate the heads 22, and a remote guide roller 24e positioned proximate a take-up reel 25 of the tape drive 10. Alternatively, one or more of the guide rollers 24a-e may each instead be configured as a fixed tape guide. Furthermore, one or more of the guide rollers 24a-e may be provided with a novel configuration, such as described below, for effectively guiding the tape 12 and controlling lateral tape movement as the tape 12 moves along or over the tape guide or guides. In addition, the configuration of the guide rollers 24a-e may be varied to achieve a desired performance for the tape guide arrangement 20.

FIGS. 2-5 show an example configuration for use with one or more of the guide rollers 24a-e, such as the outer guide rollers 24a, 24b and/or the inner guide rollers 24c, 24d. In the illustrated embodiment, the guide roller 24 includes a cylindrical or tubular hub or roller body 26 having a circular cross-section, for example, and a curved outer surface 28 for receiving the tape 12 thereon.

The guide roller 24 further includes flanges 30, such as disc-shaped flanges, provided at opposite ends of the roller body 26. The flanges 30 extend radially beyond the roller body 26, and may assist in guiding of the tape 12. In accordance with the present disclosure, at least one of the flanges 30 has a portion 32 extending outwardly from the roller body 26 and comprising two curved, circumferentially extending surfaces that curve in opposite directions, such that the portion 32 has a serpentine configuration in cross-section. In the embodiment shown in FIGS. 2-5, each flange 30 has a portion 32 with a serpentine shape or configuration (e.g., shape or configuration that turns or curves in one way and then another) in cross-section.

Figure 5:
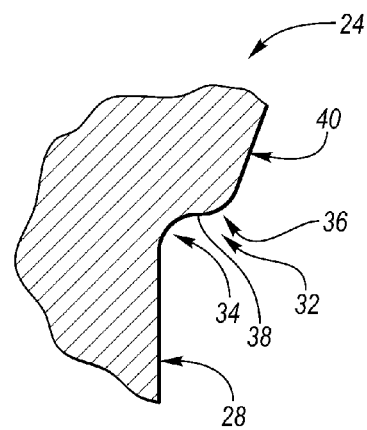
FIG. 5 is an enlarged view of a portion of the guide roller of FIG. 4.

Referring to FIG. 5, each serpentine configuration comprises first and second curves or arcs 34 and 36, respectively, that curve in opposite directions, and the first and second arcs 34 and 36 meet at a point of tangency 38. In the illustrated embodiment, the first arc 34 is disposed between the outer surface 28 of the roller body 26 and the second arc 36. More specifically, the first arc 34 extends from the outer surface 28 of the roller body 26 to the point of tangency 38, and the second arc 36 extends from the point of tangency 38 to an upwardly extending surface 40. While the first arc 34 may have any suitable length and extend through any suitable angle, in the embodiment shown in FIG. 5, the first arc 34 extends through an angle of 90° such that a line drawn tangent to the first arc 34 and through the point of tangency 38 extends perpendicularly to the outer surface 28. Likewise, while the second arc 36 may have any suitable length and extend through any suitable angle, in the embodiment shown in FIG. 5, the second arc 36 extends through an angle less than 90° such that when the tape guide 24 is viewed in cross-section, the upwardly extending surface 40 defines a line that extends at an angle with respect to a vertical line defined by the outer surface 28 of the roller body 26. For example, the second arc 36 may extend through an angle in the range of 60° to 89°.

Each arc 34, 36 may also have any suitable radius. For example, the first arc 34 may have a radius in the range of 0.002 to 0.015 inches, and the second arc 36 may have a radius in the range of 0.002 to 0.150 inches. As a more specific example, the first arc 34 may have a radius in the range of 0.002 to 0.007 inches, and the second arc 36 may have a radius in the range of 0.005 to 0.100 inches. Furthermore, the arcs 34, 36 may have the same or different size radii. For example, the second arc 36 may have a radius that is in the range of 5 to 10 times greater than the radius of the first arc 34. As another example, the second arc 36 may have a radius that is at least double the size of the radius of the first arc 34.

The serpentine configuration of each flange portion 32 may provide a continuously curved surface for contacting the tape 12 (e.g., an edge of the tape 12) and for guiding the tape 12 toward the roller body 26, such as during a tape misalignment/re-alignment event. In that regard, when a respective flange 30 is provided with a serpentine configuration, flat or conical surfaces may be eliminated between the outer surface 28 of the roller body 26 and the upwardly extending surface 40 of the flange 30. As a result, the flange size can be reduced compared to prior flange designs. In one embodiment, for example, the roller body 26 may have a roller or guide body radius $GB_r$, and each flange 30 may have a skirt radius or flange radius $F_r$ that is less than fifteen percent greater than the guide body radius $GB_r$. As a more detailed example, an embodiment according to the disclosure may have a guide body radius $GB_r$ of 0.300 inches, and a flange radius $F_r$ that is less than 0.345 inches.

Reduced flange size results in reduced flange contact length (e.g., in a radial direction) that an edge of tape 12 can have with the flange 30. Furthermore, reduced flange size results in reduced tape guide inertia, which reduces tape to tape guide slip, as well as tension variations during tape/guide accelerations or decelerations.

Referring to FIG. 6, reduced flange size may also be beneficial for reducing stress on a tape leader 42 attached to an end of the tape 12. For example, if the tape leader 42 includes ears 44 that extend laterally (e.g., vertically) beyond a main body of the tape leader 42, as well as the tape 12, the reduced flange size (e.g., reduced difference between guide body radius GB, and flange radius $F_r$) may reduce the stress on the leader ears 44 as the tape leader 42 moves over or along the guide roller 24. As a result, the useful life of the tape leader 42 may be increased.

Likewise, reduced flange size may also reduce stress on the tape 12 during spill recovery. For example, when the tape 12 moves off the guide roller 24 during a tension loss occurrence or event, and then re-engages at least one of the flanges 30 during a subsequent tension recovery event, the reduced flange size may inhibit buckling and/or bending of the tape 12. The angled outer surfaces 40 of the flanges 30 may also facilitate guiding of the tape 12 toward the serpentine configurations 32 and roller body 26 during spill recovery events.

Furthermore, when the flanges 30 are provided with serpentine configurations, the roller body 26 may be provided without gutter grooves at roller body/flange interfaces. As a result, edges of the tape 12 may remain supported by the outer surface 28 of roller body 26 until a particular edge moves away from the roller body 26 along a flange 30, such as during an occurrence of tape misalignment.

FIGS. 7-13 show additional embodiments 24', 24" and 24''' of a tape guide roller according to the present disclosure. The guide rollers 24', 24" and 24''' have similar configurations as the guide roller 24, and similar features are identified with similar reference numbers (the reference numbers in FIGS. 7 and 8, however, each include a prime mark, the reference numbers in FIGS. 9-11 each include a double prime mark, and the reference numbers in FIGS. 12 and 13 each include a triple prime mark). Furthermore, the configurations shown for any of the guide rollers 24', 24" and 24''' may be used with one or more of the tape guides 24a-e shown in FIG. 1.

Like the embodiment described above, guide roller 24' shown in FIGS. 7 and 8 includes a roller body 26' having an outer surface 28', and flanges 30' disposed at opposite ends of the roller body 26'. Furthermore, one or both of the flanges 30' may include a portion 32' extending outwardly from the roller body 26' and comprising two curved, circumferentially extending surfaces that curve in opposite directions, such that the portion 32' has a serpentine configuration in cross-section. Furthermore, each serpentine configuration may include first and second curves or arcs 34' and 36', respectively, that meet at a point of tangency 38'. Similar to the guide roller 24, the first arc 34' of the serpentine configuration of the guide roller 24' extends from the outer surface 28' of roller body 26' to the point of tangency 38', but the first arc 34' extends through an angle less than 90°. For example, the first arc 34' may extend through an angle in the range of 60° to 89°. Furthermore, in the embodiment shown in FIG. 8, the second arc 36' extends from the point of tangency 38' to an upwardly extending surface 40' that defines a line that is parallel to a line defined by the outer surface 28' of the roller body 26' when the guide roller 24' is viewed in cross-section. In addition, the second arc 36' also extends through an angle of less than 90° (e.g., 60° to 89°).

Figure 9:
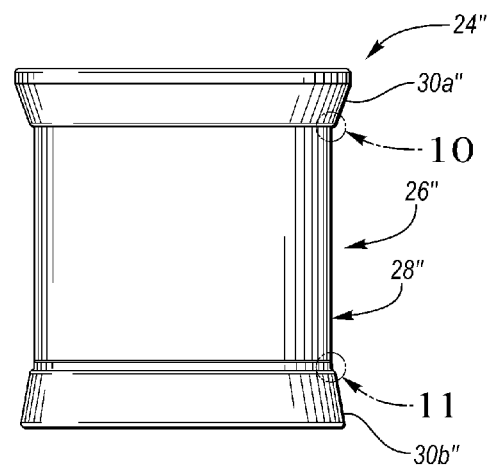
FIG. 9 is a side view of a third embodiment of the guide roller according to the present disclosure.
Figure 10:
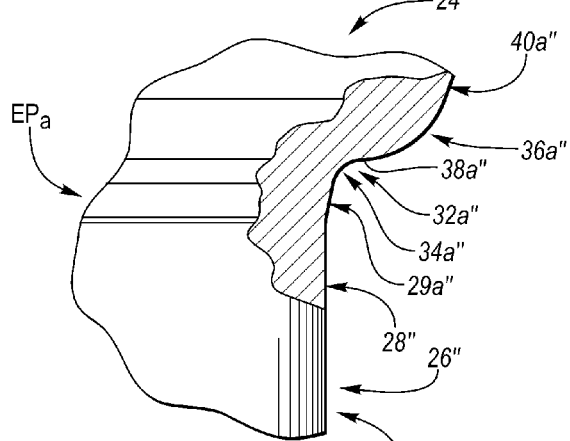
FIG. 10 is an enlarged view of an upper portion of the guide roller of FIG. 9, shown partially in section.
Figure 11:
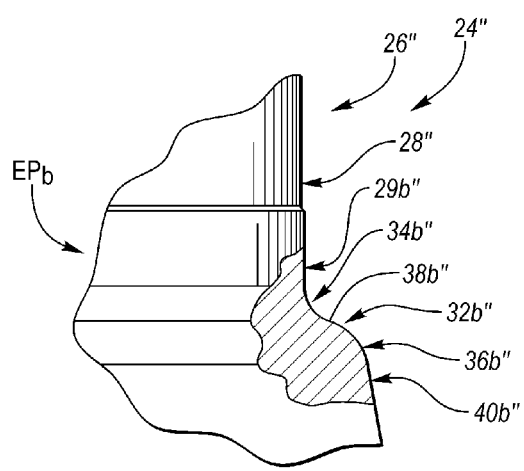
FIG. 11 is an enlarged view of a lower portion of the guide roller of FIG. 9, shown partially in section.

In the embodiment shown in FIGS. 9-11, guide roller 24" includes a roller body 26" having a main portion MP that includes an outer main surface 28" and first and second end portions $EP_a$ and $EP_b$, respectively, that include first and second outer surfaces 29a" and 29b", respectively. As shown in FIG. 10, the first outer surface 29a" is a tapered surface, such as a frusto-conical surface, that tapers outwardly away from the outer main surface 28". As shown in FIG. 11, the second outer surface 29b" is a cylindrical surface, like the outer main surface 28", but the second outer surface 29b", or corresponding second end portion $EP_b$, has a slightly larger outer diameter than the outer main surface 28", or corresponding main portion MP. For example, the second end portion $EP_b$ may have an outer diameter that is about 0.05 to 1.0% larger that the outer diameter of the main portion MP. The roller body 26" may also include intermediate portions having tapered or curved surfaces disposed between the main portion MP and the end portions $EP_a$ and $EP_b$.

Returning to FIG. 9, the guide roller 24" further includes first and second flanges 30a" and 30b", respectively, disposed at opposite ends of the roller body 26". Referring to FIGS. 10 and 11, the first and second flanges 30a" and 30b", respectively, include first and second portions portion 32a" and 32b", respectively, that each comprise two curved, circumferentially extending surfaces that curve in opposite directions, such that the portions $32_a$" and $32_b$" each have a serpentine configuration in cross-section.

In the embodiment shown in FIG. 10, the serpentine configuration of the first portion 32a" includes first and second curves or arcs 34a" and 36a", respectively, that meet at a point of tangency 38a". The first arc 34a" extends from the first outer surface 29a" of the roller body 26" to the point of tangency 38a", and the second arc 36a" extends from the point of tangency 38a" to an upwardly extending surface 40a". While the first arc 34a" may have any suitable length and extend through any suitable angle, in the embodiment shown in FIG. 10, the first arc 34a" extends through an angle of 90° such that a line drawn tangent to the first arc 34a" and through the point of tangency 38a" extends perpendicularly to the outer main surface 28" of the roller body 26". Likewise, while the second arc 36a" may have any suitable length and extend through any suitable angle, in the embodiment shown in FIG. 10, the second arc 36a" extends through an angle less than 90° (e.g., 60° to 89°) such that when the tape guide 24" is viewed in cross-section, the upwardly extending surface 40a" defines a line that extends at an angle with respect to a vertical line defined by the outer surface 28" of the roller body 26".

In the embodiment shown in FIG. 11, the serpentine configuration of the second portion 32b" also includes first and second curves or arcs 34b" and 36b", respectively, that meet at a point of tangency 38b". The first arc 34b" extends from the second outer surface 29b" of the roller body 26" to the point of tangency 38b", and the second arc 36b" extends from the point of tangency 38b" to a downwardly extending surface 40b". While the first arc 34b" may have any suitable length and extend through any suitable angle, in the embodiment shown in FIG. 11, the first arc 34b" extends through an angle less than 90° (e.g., 60° to 89°). Likewise, while the second arc 36b" may have any suitable length and extend through any suitable angle, in the embodiment shown in FIG. 11, the second arc 36b" also extends through an angle less than 90° (e.g., 60° to 89°) such that when the tape guide 24" is viewed in cross-section, the downwardly extending surface 40b" defines a line that extends at an angle with respect to vertical lines defined by the outer main surface 28" and the second outer surface 29b" of the roller body 26".

Furthermore, each arc 34a", 34b", 36a", 36b" may have any suitable radius, such as a radius within any of the above described radius ranges.

Figure 12:
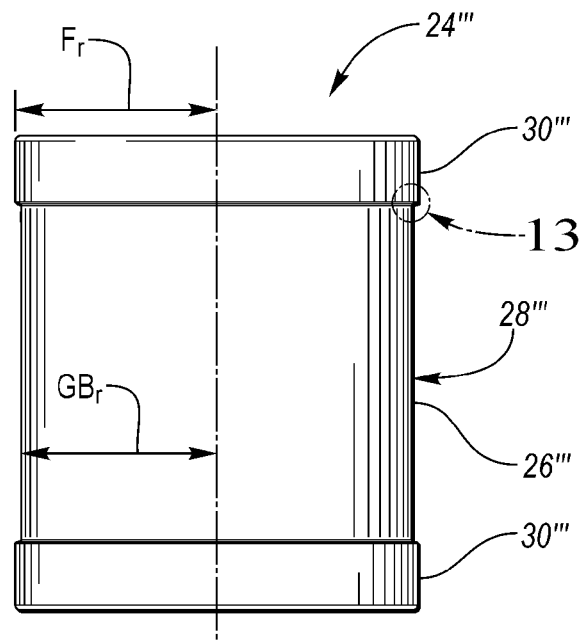
FIG. 12 is a side view of a fourth embodiment of a guide roller according to the present disclosure.
Figure 13:
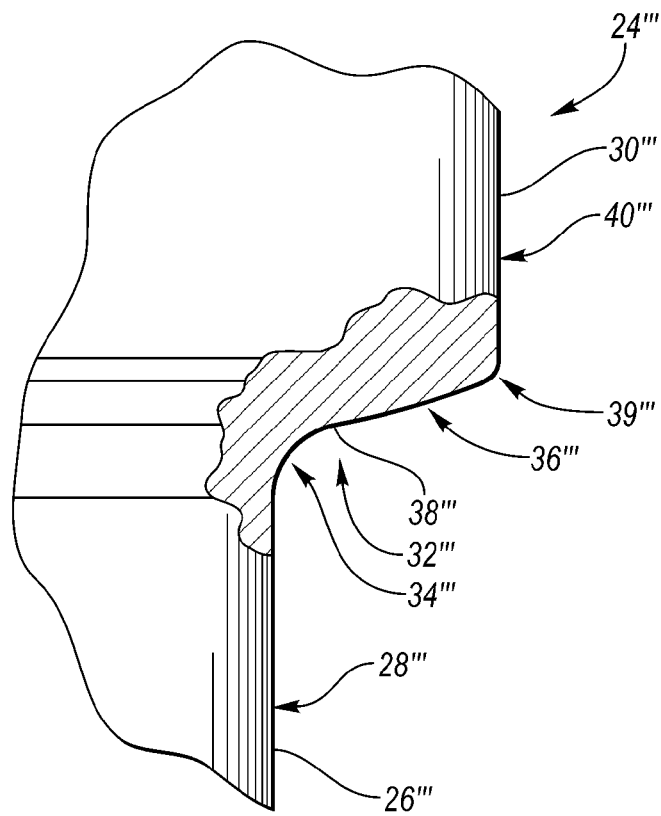
FIG. 13 is an enlarged view of a portion of the guide roller of FIG. 12, shown partially in section.

In the embodiment shown in FIGS. 12 and 13, guide roller 24''' includes a roller body 26''' having an outer surface 28''', and flanges 30''' disposed at opposite ends of the roller body 26'''. Furthermore, one or both of the flanges 30''' may include a portion 32''' extending outwardly from the roller body 26''' and comprising two curved, circumferentially extending surfaces that curve in opposite directions, such that the portion 32''' has a serpentine configuration in cross-section. Furthermore, each serpentine configuration may include first and second curves or arcs 34'''' and 36''', respectively, that meet at a point of tangency 38'''. The first arc 34''' extends from the outer surface 28''' of roller body 26''' to the point of tangency 38''', and the second arc 36''' extends from the point of tangency 38''' to a third curved, circumferentially extending surface that curves in the same direction as the second curved surface and that defines a third arc 39''' when the guide roller 24''' is viewed in cross-section. The second and third arcs 36''' and 39''', respectively, may also meet at a point of tangency. Furthermore, the third arc 39''' extends from the second arc 36''' to an upwardly extending surface 40''', which, in the embodiment shown in FIG. 12, defines a line that is parallel to a line defined by the outer surface 28''' of the roller body 26''' when the guide roller 24''' is viewed in cross-section. In another embodiment, the upwardly extending surface 40''' may define a line that extends at an angle with respect to a line defined by the outer surface 28''' when the guide roller 24''' is viewed in cross-section (e.g., the upwardly extending surface 40''' may be a frustoconical surface like in FIG. 4).

Each arc 34''', 36''' and 39''' may extend through any suitable angle, such as an angle within any of the above described angle ranges. In the embodiment shown in FIG. 12, for example, each arc 34''', 36''' and 39''' extends through an angle less than 90°. As a more specific example, the first and third arcs 34''' and 39''' may each extend through an angle in the range of 60° to 89°, and the second arc 36''' may extend through an angle less than 75° (e.g., less than 45°).

Furthermore, each arc 34''', 36''' and 39''' may have any suitable radius, such as a radius within any of the above described radius ranges. For example, the first and third arcs 34''' and 39''', respectively, may each have a radius in the range of 0.002 to 0.015 inches, and the second arc 36''' may have a radius in the range of 0.002 to 0.15 inches. In the embodiment shown in FIG. 12, the radius of the second arc 36''' is much larger (e.g., at least 5 times larger) than the radius of each of the first and third arcs 34''' and 39''', respectively.

With the above configuration, the second arc 36''' does not need to directly meet the upwardly extending surface 40'''. As a result, the second arc 36''' may be configured to provide a gradual curve toward or away from the first arc 34''' (e.g., the second arc 36''' may be provided with a relatively large radius), while the overall flange radius $F_r$''' of the flange 30''' may be kept relatively small. For example, the second arc 36''' may have a radius in the range of 0.07 to 0.15 inches, while the overall flange radius $F_r$''' may be less than fifteen percent greater than the guide body radius $GB_r$''' (even if the upwardly extending surface 40''' is a conical surface or frustoconical surface). As a more detailed example, with the above described radius range for the second arc 36''', the guide roller 24''' may have a guide body radius $GB_r$''' of 0.300 inches and a flange radius $F_r$''' that is less than 0.345 inches.

Any of the above described features of one of the above embodiments may be used with any of the other embodiments. For example, any of the roller bodies 26, 26', 26''' may be provided with the configuration of the roller body 26" of the tape guide roller 24". Furthermore, each tape guide roller 24, 24', 24", 24''' may be provided with any of the above described flange configurations. In addition, any of the above described flange configurations may provide one or more of the benefits or advantages described with respect to the tape guide roller 24.

Each tape guide roller 24, 24', 24", 24''' may be made of any suitable material and in any suitable manner. For example, each guide roller may be made of cast or molded metal or molded plastic (e.g., compression or injection molded plastic), and the portions 32, 32', 32", 32''' with the curved, circumferentially extending surfaces may be formed or further refined by a milling operation. Furthermore, each guide roller 24, 24', 24", 24''' may be made as a single piece, or multiple pieces bonded or fused together.

While exemplary embodiments are described above, it is not intended that these embodiments describe all possible forms according to the disclosure. In that regard, the words used in the specification are words of description rather than limitation, and it is understood that various changes may be made without departing from the spirit and scope of the invention. Additionally, the features of various implementing embodiments may be combined to form further embodiments according to the disclosure.

What is claimed is:

1. A tape guide roller for a tape drive configured to receive a length of tape, the tape guide roller comprising:
    a roller body having an outer surface for receiving the tape thereon; and
    flanges on opposite ends of the roller body, at least one of the flanges having a portion with a serpentine configuration in cross-section, wherein the serpentine configuration comprises first and second arcs that curve in opposite directions and that meet at a point of tangency, such that the serpentine configuration defines a continuously curved shape in cross-section.

2. The tape guide roller of claim 1 wherein the first arc is disposed between the outer surface of the roller body and the second arc, and the first arc extends through an angle of 90°.

3. The tape guide roller of claim 1 wherein the first arc is disposed between the outer surface of the roller body and the second arc, and the first arc extends through an angle less than 90°.

4. The tape guide roller of claim 1 wherein the first arc extends from the outer surface of the roller body to the point of tangency, and the second arc extends from the point of tangency to an upwardly or downwardly extending surface.

5. The tape guide roller of claim 4 wherein, in cross-section, the upwardly or downwardly extending surface defines a line that is parallel to a line defined by the outer surface of the roller body.

6. The tape guide roller of claim 4 wherein, in cross-section, the upwardly or downwardly extending surface defines a line that extends at an angle with respect to a line defined by the outer surface of the roller body.

7. The tape guide roller of claim 1 wherein the first arc extends between the outer surface of the roller body to the point of tangency, and the second arc extends from the point of tangency to a curved surface that defines a third arc in cross-section.

8. The tape guide roller of claim 1 wherein the roller body has a roller body radius that extends from a center line of the roller body, and the at least one flange has a flange radius that extends from the center line of the roller body and that is less than fifteen percent greater than the roller body radius.

9. The tape guide roller of claim 1 wherein each flange has a portion with a serpentine configuration in cross-section, and each serpentine configuration comprises first and second arcs that curve in opposite directions, and wherein, for each serpentine configuration, the first and second arcs meet at a point of tangency.

10. A tape drive for use with a length of tape, the tape drive comprising:
    a drive body; and
    a tape guide roller mounted on the drive body, the tape guide roller including a roller body having an outer surface for receiving the tape thereon, and flanges on opposite ends of the roller body, at least one of the flanges having a portion with a serpentine configuration in cross-section, wherein the serpentine configuration comprises first and second arcs that curve in opposite directions and that meet at a point of tangency, such that the serpentine configuration defines a continuously curved shape in cross-section.

11. The tape drive of claim 10 wherein the first arc extends between the outer surface of the roller body to the point of tangency, and the second arc extends from the point of tangency to a curved surface that defines a third arc in cross-section.

12. The tape drive of claim 10 wherein each flange has a portion with a serpentine configuration in cross-section, and each serpentine configuration comprises first and second arcs that curve in opposite directions, and wherein, for each serpentine configuration, the first and second arcs meet at a point of tangency.

13. The tape drive of claim 12 wherein the roller body has a roller body radius that extends from a center line of the roller body, and each flange has a flange radius that extends from the center line of the roller body and that is less than fifteen percent greater than the roller body radius.

* * * * *

UNITED STATES PATENT AND TRADEMARK OFFICE
CERTIFICATE OF CORRECTION

PATENT NO.        : 8,947,824 B1
APPLICATION NO.   : 14/068315
DATED             : February 3, 2015
INVENTOR(S)       : Coburn It is certified that error appears in the above-identified patent and that said Letters Patent is hereby corrected as shown below:

In the Specification

In column 5, line 14, delete "$32_a$" and $32_b$"" and insert -- 32a" and 32b" --, therefor.

Signed and Sealed this
Twenty-fourth Day of November, 2015

Michelle K. Lee
*Director of the United States Patent and Trademark Office*